March 14, 1961 G. PÖTING 2,974,446
APPARATUS FOR THE PRODUCTION OF HOLLOW GLASS VESSELS
Filed June 5, 1957 2 Sheets-Sheet 1

Inventor
GÜNTER PÖTING

BY Robert H. Jacob.
AGENT

March 14, 1961 G. PÖTING 2,974,446
APPARATUS FOR THE PRODUCTION OF HOLLOW GLASS VESSELS
Filed June 5, 1957 2 Sheets-Sheet 2
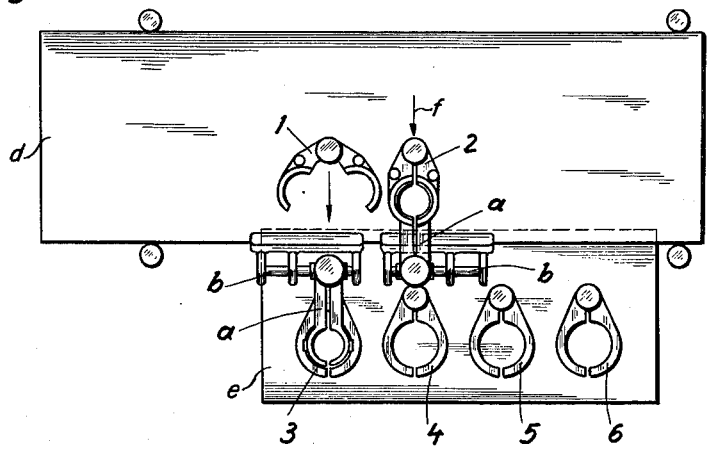
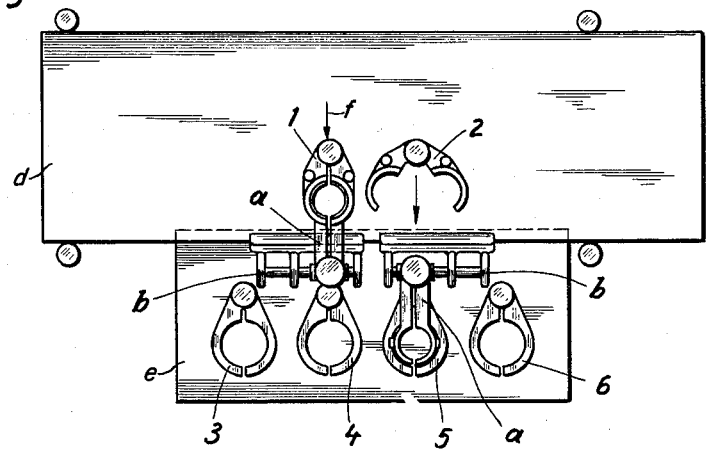
Inventor
GÜNTER PÖTING
BY Robert H. Jacob.
AGENT United States Patent Office 2,974,446
Patented Mar. 14, 1961

2,974,446

APPARATUS FOR THE PRODUCTION OF HOLLOW GLASS VESSELS

Günter Pöting, Erkrath, near Dusseldorf, Germany, assignor to Ingenieurburo Walter Pöting K.-G., Dusseldorf, Germany Filed June 5, 1957, Ser. No. 663,697

Claims priority, application Germany June 7, 1956

2 Claims. (Cl. 49—9)

The invention relates to an operating device for the production of hollow glass vessels, in which the liquid glass is poured into a gathering mold and from this mold transferred to a finishing mold, and has for its object to increase the working capacity of such devices while avoiding special measures for preventing undesirable deformation of the hollow vessel while it is being removed from the finishing mold.

In the known devices for automatically producing hollow glass vessels, such as bottles, irrespectively of whether they are equipped with a turntable carrying the molds or with stationary molds and a movable charging device, a gathering mold and a finishing mold are always provided for producing a bottle.

Of the time required for producing a vessel, about one-third is devoted to the working of the glass in the gathering mold and about two-thirds for the working of the glass in the finishing mold, including the removal of the bottle from the finishing mold. The gathering mold will therefore be in use less than half the time of the finishing mold.

If relatively heavy glass articles are to be produced, difficulties arise, particularly in the case of the finishing mold, in that the time available for the repeated transfer of a bottle from a gathering mold to a finishing mold is not sufficient for the bottle to be removed from the finishing mold without danger of undesirable deformation. This has led to the introduction of supplementary measures outside the finishing mold for preventing undesirable deformation. For this purpose cups, sleeves or cooling plates are used on which the bottles removed from the finishing mold are enveloped in cooling air.

For preventing undesirable deformation, the composition of the glass was also changed so as to attain a solidifying point for the glass at a higher temperature. However, changing the glass composition results in that the melting capacity of the glass furnace decreases and often leads to difficulties in the case of fully loaded melting furnaces.

Heretofore the only effective measure for overcoming the known difficulties was to reduce the number of working cycles per unit of time so as to allow the glass to remain longer in the finishing mold.

The invention follows a new course for avoiding the known difficulties while simultaneously increasing the production capacity per unit of time. In accordance with the invention, the extra time available for the gathering mold as compared with the finishing mold is utilized for production in that for each gathering mold a second finishing mold is provided which, in the interval otherwise necessary for the gathering mold, takes over from this form glass articles when the gathering mold has again been charged with molten glass subsequent to the transfer of the glass from the gathering mold to the first finishing mold.

As a result the working capacity of the device will be theoretically doubled and in addition the necessary slowing down of the working cycle to allow the glass to remain in the finishing mold the required time for solidifying is only half as long as when working with a single finishing mold.

An embodiment of the invention is illustrated by way of example in the accompanying drawings, in which:

Fig. 4 shows the third working phase, while

Fig. 5 shows the working phase which precedes the phase illustrated in Fig. 2.

The form of construction illustrated by way of example relates to a so-called feeder machine with two table arrangement comprising tables $d$ and $e$ which are movable relative to each other and also relative to the charging station $f$. These machines and the manner in which they operate are known, so that it is not necessary to illustrate and describe the machines in detail, but both the drawings and description are restricted to the details which are essential for understanding the invention.

Figure 1:
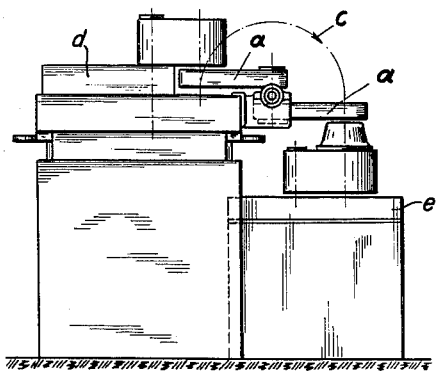
Fig. 1 shows the device in side elevation.

In the example illustrated, two gathering molds 1 and 2 are mounted on table $d$ and four finishing molds 3, 4, 5 and 6 are provided mounted on table $e$. The molds are associated in a first group comprising molds 1, 3 and 4 and a second group comprising molds 2, 5 and 6. The transfer of the glass from the gathering molds to the finishing molds is effected by means of grippers $a$ which swing alternately about their axles $b$. The swing curve is illustrated by the arrow $c$ in Fig. 1.

Figure 2:
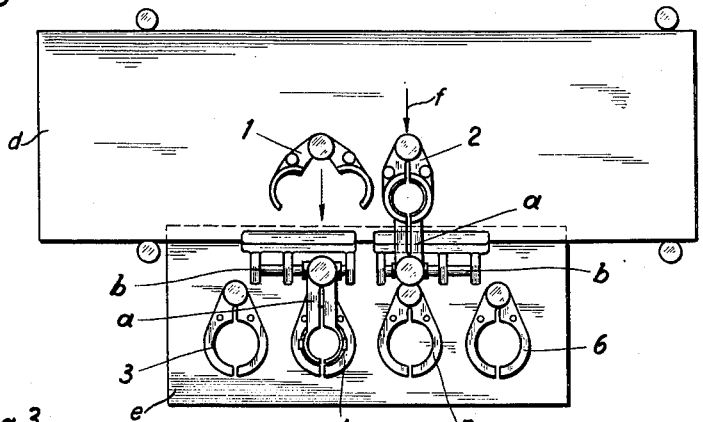
Fig. 2 shows the position of the gathering mold and finishing mold at the commencement of work.
Figure 3:
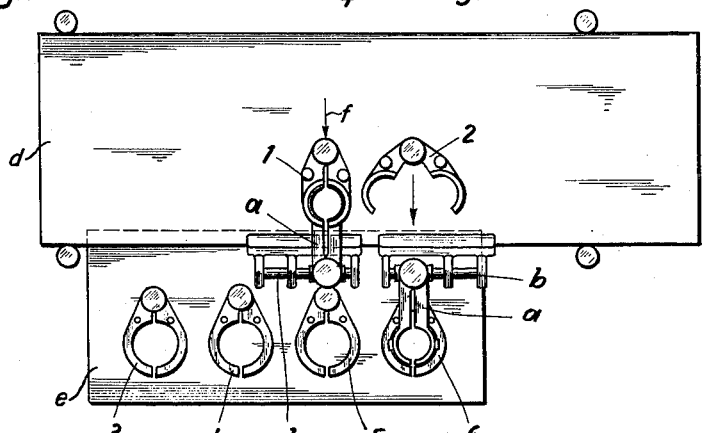
Fig. 3 shows the second working phase.

In Fig. 2 the blank from the gathering mold 1 is transferred to the finishing mold 4 while the gathering mold 2 is being filled with molten glass at the charging station $f$. Thereupon the gathering molds 1 and 2 are shifted towards the right as shown in Fig. 3, thereby bringing the gathering mold 2 adjacent the finishing mold 6 and the gathering mold 1, which has just released the blank to the finishing mold 4, under the charging point for the purpose of being recharged with molten glass. The glass can solidify in the finishing mold 4 until it can be removed without danger of deformation. When the gathering mold 1 has been recharged and the gathering mold 2 has released the blank to the finishing mold 6, the gathering molds are shifted towards the left as shown in Fig. 4 and at the same time the finishing molds are moved towards the right so that the filled gathering mold 1 comes adjacent the finishing mold 3 and the blank can be transferred from the gathering mold 1 to the finishing mold 3. The gathering mold 2 is once more under the charging point.

During the next working phase, the gathering molds are again shifted towards the right as seen in Fig. 5. The gathering mold 2 thereby comes adjacent the finishing mold 5, so that its contents can be transferred to the finishing mold 5, whereas the gathering mold 1 is located under the charging point.

In the meantime the glass in the finishing mold 4 has solidified to such an extent that it can be removed therefrom without danger of deformation.

In the next working phase the gathering molds and finishing molds are again shifted to the position illustrated in Fig. 2. This is accomplished by shifting the gathering molds as well as the finishing molds to the left so that mold No. 2 will be in gathering position while mold No. 1 will be maintained opposite mold No. 4.

I claim:

1. In a system for the production of hollow glass vessels, particularly bottles, including a charging station, gathering molds adapted to receive liquid glass from said charging station for preforming the blanks, a transfer gripper for each gathering mold, and finishing molds adapted to receive preformed blanks by way of said grippers from said gathering molds to be cooled and set therein, the arrangement comprising a pair of gathering molds and a pair of finishing molds for each gathering mold associated in first and second groups, each defined by a gathering mold and two finishing molds, said gathering molds being mounted for movement relative to said charging station, adjacent finishing molds being disposed at equal distances from each other and adjacent gathering molds being spaced from each other by the same equal distances as said finishing molds, means supporting said gathering molds for shifting as a unit relative to said charging station, and means supporting said finishing molds in alignment with and for shifting as a unit relative to said gathering molds in a manner that one of the gathering molds of said first group when filled is disposed adjacent one of the pair of associated molds and adapted to release the blank for transfer thereto.

2. In a system in accordance with claim 1, said gathering molds on their supporting means aligned in a first row and said finishing molds on their supporting means aligned in a second row parallel to said first row and said means supporting the gathering molds movable parallel to said means supporting the finishing molds.

References Cited in the file of this patent

UNITED STATES PATENTS

| | | |
|---|---|---|
| 697,915 | Haley | Apr. 15, 1902 |
| 1,745,794 | Hatch | Feb. 4, 1930 |